Patented May 20, 1930

1,759,096

UNITED STATES PATENT OFFICE

MARTIN B. COVERT, OF HOLLAND, MICHIGAN

PROCESS OF RECONDITIONING POPPET-VALVE ENGINES

No Drawing.  Application filed July 26, 1929. Serial No. 381,407.

This invention relates to a process of reconditioning a poppet valve internal combustion engine without removing the valve or tearing down the motor as heretofore practiced in the grinding of valves for reseating purposes.

The chief object of the invention is to recondition a poppet valve internal combustion engine with a minimum of labor, material and equipment The chief feature of the invention consists in the employment of a process that requires only the use of a liquid, the predominant part of which is or may be kerosene, and wrenches for adjusting valve tappet clearance and removing and replacing spark plugs when required.

The invention consists in utilizing about a pint of liquid material, the major portion of which may be kerosene, or the like, and the same may be colored, if desired, although the color is not necessary and does not add any to the efficiency of the operation.

In engines that are provided with injector cups, removal of the spark plugs is not required. In engines not so equipped the spark plugs are removed after the engine has been heated, preferably by running it. Into each cylinder and onto the top of the piston therein is poured about two ounces of the liquid, the remainder is placed in the fuel tank and the amount of fuel may be reduced so that the majority of the fuel will consist of the kerosene mixture or kerosene. After the engine has cooled and has stood for approximately five hours or so the spark plugs are replaced, or the injector cups are closed.

The valve tappets of the poppet valve are then backed off or lashed to a clearance of at least a thirty-second of an inch or .035. The engine is then driven at high speed under load for a considerable period, such as a half hour or more. For example, the car may be driven 20 to 25 miles at 40 to 50 miles per hour.

After this load operation, the valve tappets are readjusted to the initial clearance which is about .006 within a tolerance of .001 or .002 depending upon the particular design of the motor as well as the design of the cam actuating the valve.

The chemical employed has the property of cutting the rust, loosening the carbon, and as a result the carbon is discharged from the engine through the exhaust valves when the engine is running under load. Actual tests by the use of the compression gauge have determined that the aforesaid method of reconditioning a poppet valve engine is more efficient than a manual job of valve grinding, and that the compression in each cylinder is more like that of every other cylinder than is obtainable by the manual grinding of the valves in each cylinder.

The invention claimed is:

1. The process of reconditioning a poppet valve internal combustion engine consisting of heating the engine, supplying about two ounces of liquid to each cylinder above and upon the piston, the chief ingredient of the liquid being kerosene, permitting the engines to cool for about five hours, adjusting the valve tappets for improper seating, running the engine under sufficient load and for sufficient time to decarbonize the valves, seats and all other surfaces in the combustion chamber, and then readjusting the valve clearance for perfect seating of the valves.

2. The process of reconditioning a poppet valve internal combustion engine consisting of running the engine for heating it, supplying about two ounces of decarbonizing liquid to the combustion chamber of each, the chief ingredient of the liquid being kerosene, permitting the engine to cool for about five hours, lashing the valve tappets for excessive clearance, running the engine for about 20 to 25 miles at 40 to 50 miles per hour, and then readjusting the valve clearance for perfect seating of the valve.

3. The process of reconditioning a poppet valve internal combustion engine, heating the engine, removing the engine spark plugs, supplying about two ounces of decarbonizing liquid to the combustion chamber of each cylinder, the chief ingredient of the liquid being kerosene, permitting the engine to cool for about five hours replacing the spark plugs lashing the valve tappets for excessive clearance, running the engine and under sufficient load and for sufficient time to decarbonize the carbon covered surfaces in the combustion chamber and remove the freed carbon from the engine, and then readjusting the valve clearance for perfect seating of the valves.

4. The process of reconditioning a poppet valve internal combustion engine consisting of running the engine to heat the same, removing the spark plugs from the engine, supplying about two ounces of decarbonized liquid to the combustion chamber of each cylinder through the spark plug opening, the chief ingredient of the liquid being kerosene, permitting the engine to cool for about five hours, lashing the valve tappets for excessive clearance, restoring the spark plugs, running the engine for about 20 to 25 miles at 40 to 50 miles per hour to decarbonize the carbon covered surfaces in the combustion chamber and remove the freed carbon from the engine, and then readjusting the valve clearance for perfect seating of the valves.

In witness whereof, I have hereunto affixed my signature.

MARTIN B. COVERT.